Jan. 11, 1949.  J. P. JONES  2,459,130
CREAM DISPENSER
Filed Jan. 12, 1946
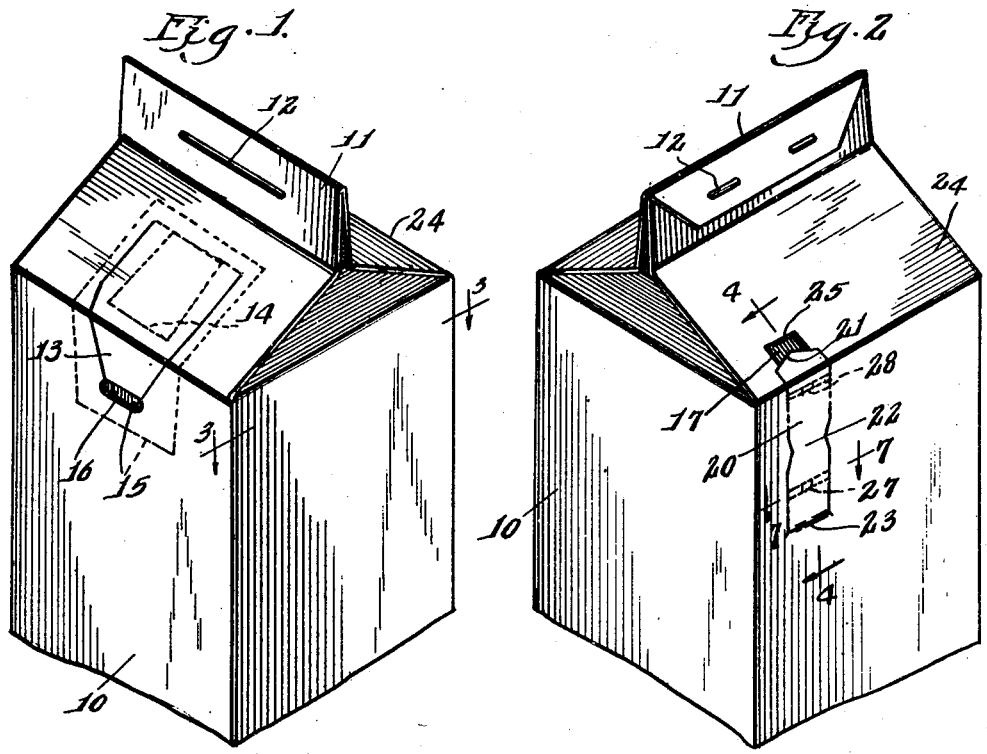
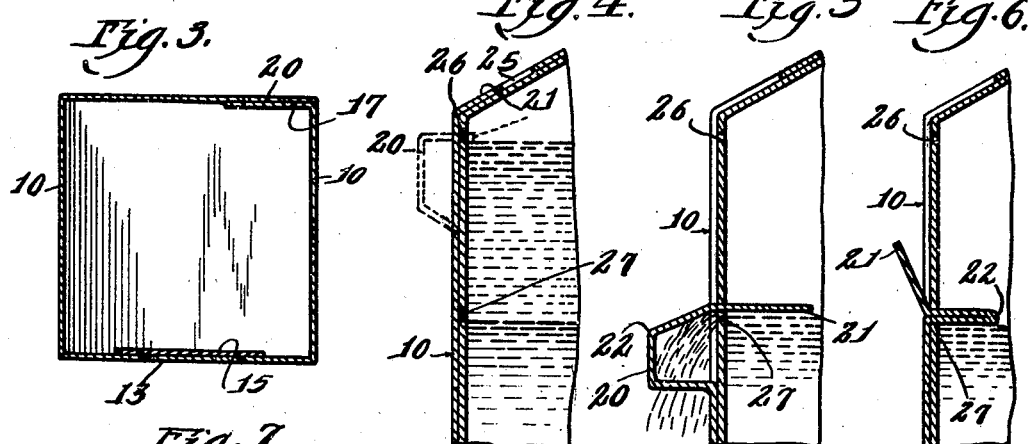
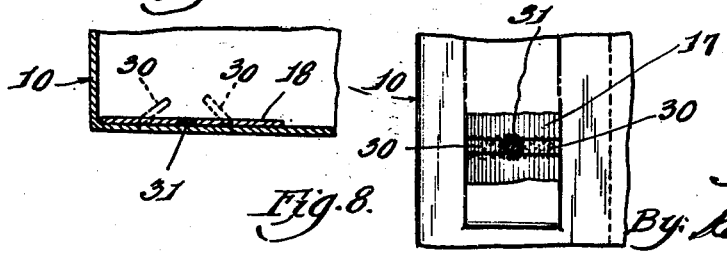
Inventor:-
John Paul Jones Patented Jan. 11, 1949

2,459,130

UNITED STATES PATENT OFFICE 2,459,130

CREAM DISPENSER

John Paul Jones, Omaha, Nebr., assignor to The Dairy Specialties Company, Incorporated, Omaha, Nebr., a corporation of Nebraska Application January 12, 1946, Serial No. 640,934

6 Claims. (Cl. 229—7)

This invention relates in general to a cream dispenser for a paper milk bottle type of container although it may have a more general use wherever applicable.

An important object of the invention is to provide new and improved means for discharging the cream from the top of a milk container.

A further object of the invention is to provide a cream discharging means in conjunction with the ordinary milk pouring aperture of a container but located on the opposite side thereof.

Still a further object of the invention is to provide a cream dispenser for a milk container which is incorporated in the overlapping portions of a milk container so that little additional material is required in producing the cream dispenser, and the construction employed does not require an accurate matching of the overlapping parts of the container to make the cream dispenser operative.

A further object of the invention is to provide a cream dispenser comprising upper and lower openings normally sealed by the application of a wax-like material to the container and the seal being broken only as desired by a special flap disengaged from the outer wall of the container.

Still a further object of the invention is to provide cream dispensing means having upper and lower apertures pierced by the extremity of a movable flap and either of the apertures being sealed after opening by the insertion of the flap or a portion thereof.

Other objects of the invention will appear in the specification and will be apparent from the accompanying drawings in which, Fig. 1 is a perspective view of a portion of the upper end of a paper type of container for milk and cream showing the normal milk and cream dispensing means at one side thereof;

Fig. 2 is a perspective view of the upper portion of the opposite side of a container as shown in Fig. 1 with the dispensing means of this invention located adjacent one corner of the container;

Fig. 3 is a sectional view of the container taken on the line 3—3 of Fig. 1;

Fig. 4 is a sectional view of the dispensing means as shown in Fig. 2;

Fig. 5 is a view similar to Fig. 4 showing the flap of the dispensing means inserted in the lower opening for discharging contents of the container;

Fig. 6 is a sectional view similar to Fig. 5 showing the flap inserted in the lower opening for sealing purposes;

Fig. 7 is a sectional detail of one of the dispensing openings as taken on the line 7—7 of Fig. 2; and Fig. 8 is an elevational detail with the flap broken away, of the lower opening as shown in Fig. 2 before the seal is broken.

In using the waxed paper type of milk and cream containers, some customers prefer a single pouring aperture for milk and cream as now commonly employed and shown in Fig. 1. A large number of other users prefer to separate the cream which collects at the top of a milk container to discharge it therefrom and thereafter to use the contents of the container, pouring it therefrom through the ordinary opening as shown in Fig. 1.

The makers of milk containers of this type generally object to any addition to the container which uses more material, requires more work in the construction, or requires greater accuracy in matching or assembling the parts. The present invention overcomes these objections by providing a relatively narrow flap which can be incorporated in the normally overlapping portion at the corner of a container which is used in joining the walls thereof. By providing the flap in the outer wall and by locating the openings in the underlying lapped portion, it is not necessary that extreme accuracy be used in lining up these parts, the normal assembly being sufficient which will bring a partly perforated closing lap below the outer wall of the container in which a partially severed flap is located.

With this construction, a customer can utilize either the pouring flap of Fig. 1 or the cream removing flap of Fig. 2 or may use them both in combination, using the cream removing flap first to discharge the accumulation of cream from the top of the container, then sealing or partially sealing the cream dispensing openings and utilizing the larger pouring flap for discharging the contents of the container. This construction pleases both the manufacturer of the container since it costs practically no more for him to produce it, and it pleases the user of the milk because he can dispense the cream separately therefrom or not as he prefers for any separate container, and also it pleases the milk company which supplies the milk since the container requires no extra operations or precautions upon his part to satisfy both the customer who prefers a cream discharging container and one who does not care for this feature.

Referring now more particularly to the drawing, the invention is considered as applied to an ordinary type of waxed paper milk container 10, having rectangular walls, a folded top 11 sealed by a staple 12 and an ordinary discharging aperture at one side of the top consisting of a flap 13 in the outer wall and an inner flap 14 formed in an inside wall portion 15 and adhering to the outer wall, the flaps being secured together and the inner flap being normally raised with the outer flap to provide the discharge opening. At the lower end of the outer flap is an aperture 16 formed in the outer wall and sealed by the inner wall 15 into which the fingernail of an operator or an implement may be inserted to assist in raising the outer flap 13, the flaps usually being sealed by a wax-like coating which also makes the walls impervious to the passage of liquid.

The container is usually formed from a single piece of material with an underlapping portion 17 extending longitudinally of one side, preferably at the corner thereof as shown in Fig. 3 and in this lapping portion which may be at the side opposite the pouring aperture shown in Fig. 1 is the cream dispensing structure of the present invention. Instead of being located in an overlapping structure, it is obvious that a separate wall 18 may be secured to the outer wall of a container as shown in Fig. 7, the inner wall 18 thus containing all the features of construction which are described in connection with the overlapping portion having the same relative parts as herein described. The advantage of locating the cooperating flap and openings in the overlapping wall portions is that it is not necessary to accurately position a separate wall portion as 18 at the interior of a wall before the milk container is constructed.

In the outer wall of the container, a somewhat narrow flap 20 is formed by partially severing the sides thereof to form an angular tip 21, a reduced portion 22 intermediate the ends and having a hinge 23 at the bottom connecting it with the wall. At the upper end of this flap which preferably projects over an inclined top 24 at one side of the container is a recess 25 in the outer wall adjacent the angular end of the flap to assist in disengaging and moving the flap outwardly. The flap 20 and the opening 25 are covered at the inside by the underlapping wall 17, and in the inner wall is an upper opening 26 usually designated as the air inlet opening, and a lower opening 27 usually designated as the cream discharge opening and located at the lower cream level so that when a container is located in upright position, practically all of the cream will be discharged from the lower opening.

The opening 26 comprises a pair of projections 28 hinged at the sides and extending toward the center thereof but not entirely closing the opening and the opening being in the form of a slot when the projections are pressed inwardly by inserting the pointed end 21 of the outer flap 20. This opening 26 is preferably in the form of a slot having width only that of the thickness of the end of the flap 20 so that by inserting the end of the flap inwardly as shown in the broken outline in Fig. 4, this opening may be sealed by the flap.

Likewise the cream discharging opening 27 is formed by projections 30 hinged at the sides of the opening and extending toward the center thereof for normally closing the opening together, when open, forming a slot of a width substantially twice that of the thickness of the flap 20 so that the flap may be inserted as shown in Fig. 5, leaving a space for the liquid contents of the container to discharge therefrom, or if the flap 20 is folded upon itself at the reduced portion 22, and inserted through the slot 27 as shown in Fig. 6, this slot will be substantially closed and sealed. The reduced portion 22 is preferably an angular reduction so that when folded upon itself in this manner, the extremity of the folded portion will be reduced to facilitate its insertion into the milk discharging opening 27.

Both of the openings 26 and 27, together with the projections 28 and 30 thereof, are sealed by the wax or other coating which is applied to the inside of the container for transferring it and making it impervious to moisture, a portion 31 of the sealing material engaging in the opening at the ends of the projections and preferably closing the openings entirely so that it is necessary to insert the pointed extremity 21 of the flap 20 in order to break this seal, to press the projections inwardly and to completely free the openings 26 and 27.

With this construction, it is apparent that the milk container is made or produced in the ordinary manner; it is processed or treated as usual to wax or coat the material of the container making it impervious to liquid, the container is filled by the milk producer in the ordinary manner and delivered to customers without regard to their preference for cream dispensing container or simply a pouring container. If a customer wishes to use the cream dispensing construction, he disengages the flap 20 by engaging the pointed extremity 21, the air inlet is opened by inserting the pointed extremity 21 through the opening 26, breaking the wax seal, and pushing the projections inwardly. The flap 20 is further disengaged and the cream discharging opening may then be broken by inserting the extremity 21 through the opening 27, breaking the wax seal and pushing the projections 30 inwardly. If desired, the extremity of the flap may remain inserted into the pouring opening 27 which will provide a guiding and pouring spout, causing the cream to be discharged at either side of the flap limiting the outward movement of the liquid directly in front of the opening and thus preventing it from splashing or discharging too far outwardly. After the cream or upper contents of the container has been discharged, the extremity of the flap may be withdrawn, the intermediate portion of the flap doubled upon itself and inserted in the opening 27 to seal it. This operation may be performed before all of the cream is dispensed from the container by tilting the container backwardly from the opening 27 which will lower the level of liquid therein so that the flap may then be inserted as a seal, retaining a portion of the cream within the container so that it may be discharged in a similar manner at a later time.

While this construction is particularly described in connection with a container for milk and cream, it is apparent that it may have a more general application to containers for various liquids. Various other constructions, combinations, and arrangements of the parts may be made without departing from the spirit and scope of the invention.

I claim:

1. In a milk and cream dispensing container of the normally upright paper bottle type, means forming a normally sealed dispensing opening at one side of the top of the container, the walls of the container being wrapped around and overlapped at the vertically opposite side of the container, a narrow flap in the outer vertical overlapping wall, and a pair of horizontal openings in the inner vertical wall, one at the lower cream level and the other above the upper cream level, both of said openings being normally closed by the flap and uncovered when the flap is swung downwardly therefrom.

2. A cream dispenser for a normally upright paper bottle type of container, comprising inner and outer vertical walls, a flap in the outer wall hinged at the bottom and movable outwardly therefrom and having a pointed extremity, discharging horizontal slot means in the inner wall comprising projections hinged at the ends of the slot and extending inwardly in the slot, and sealing material in the slot for holding the projections therein, the pointed end of the flap being insertable through the slot to break the sealing material and to push the projections aside within the container thereby opening the slot when the flap is moved outwardly.

3. A cream dispensing opening for a milk container of the paper bottle type, comprising an inner wall, an overlying outer wall, a narrow flap in the outer wall hinged at the bottom and having a reduced neck portion intermediate its ends, a pair of dispensing openings in the inner wall, each opening comprising a slot with hinged end projections, means for sealing the end projections in the opening of the inner wall, the projections of the upper opening being engageable by the upper extremity of the flap to open the upper slot, and the projections of the lower slot being engageable by the reduced neck portion of the flap when it is turned inwardly through the bottom slot.

4. A cream dispensing opening for a milk container of the normally upright paper bottle type, comprising inner and outer vertical walls with a flap in the outer vertical wall hinged at the bottom and extending upwardly, transverse horizontal slots at different levels in the inner wall covered by the flap, the upper slot being above the upper cream level and having a width substantially the same as that of the thickness of the flap and the lower slot being at the lower cream level and having a width substantially twice the thickness of the flap, and the end of the flap being insertable through the upper opening to seal it and the intermediate portion of the flap being bendable upon itself and insertable through the lower slot to seal it.

5. A cream dispenser for a container of the paper bottle type, comprising inner and outer walls, the outer wall having a narrow flap hinged at the bottom therein with a pointed upper extremity and a reduced neck intermediate its ends, the inner wall having upper and lower slots extending transversely of the flap, the slots having projections extending from the ends of the slots and means for sealing them in closed position against the flap, the upper slot being of the width substantially that of the thickness of the flap, and the lower slot being of a width substantially twice the thickness of the flap, the upper end of the flap being movable to break the seal of the upper slot and to close the slot by inserting the end therein, and the lower slot being opened by inserting the end of the flap and being closable by folding the flap upon itself at the reduced neck portion and inserting the double neck portion into and through the slot.

6. A cream dispenser for a milk container of the normally vertical paper bottle type, comprising an inner vertical wall and an outer vertical wall having a flap hinged at the bottom and removable from the top downwardly, slots in the inner wall extending horizontally and transversely of the flap above and at the lower level of cream in the container, the flap being insertable in the slots to open them, and the end of the flap being insertable in the lower opening and the intermediate portion projecting angularly outward and downwardly therefrom below the lower opening to provide a guiding pouring spout to discharge cream at either side of the flap.

JOHN PAUL JONES.

REFERENCES CITED

The following references are of record in the file of this patent:

UNITED STATES PATENTS

| Number | Name | Date |
|---|---|---|
| 1,079,394 | Carey | Nov. 25, 1913 |
| 1,539,985 | Allen | June 2, 1925 |
| 1,967,978 | Sprague | July 24, 1934 |
| 2,166,222 | Ranko et al. | Jan. 18, 1939 |
| 2,263,957 | Sooy | Nov. 25, 1941 |
| 2,311,333 | French | Feb. 16, 1943 |
| 2,330,926 | Raus | Oct. 5, 1943 |
| 2,342,081 | Kirkland et al. | Feb. 15, 1944 |